United States Patent [19]

Vondran

[11] Patent Number: 5,298,071

[45] Date of Patent: Mar. 29, 1994

[54] INTERGROUND FIBER CEMENT

[75] Inventor: Gary L. Vondran, Los Altos, Calif.

[73] Assignee: Vontech International Corporation, Los Altos, Calif.

[21] Appl. No.: 92,582

[22] Filed: Jul. 16, 1993

Related U.S. Application Data

[63] Continuation of Ser. No. 934,589, Aug. 24, 1992, abandoned, which is a continuation of Ser. No. 801,972, Dec. 2, 1991, abandoned, which is a continuation of Ser. No. 580,831, Sep. 11, 1990, abandoned, which is a continuation-in-part of Ser. No. 498,223, Mar. 23, 1990, abandoned.

[51] Int. Cl.⁵ ............................ C04B 2/10; C04B 7/52
[52] U.S. Cl. ...................................... 106/757; 106/711; 106/724; 106/819; 428/688; 428/703
[58] Field of Search ............... 106/711, 724, 757, 819; 428/703, 688

[56] References Cited

U.S. PATENT DOCUMENTS

| | | | |
|---|---|---|---|
| 1,283,546 | 11/1918 | Olson | 106/724 |
| 1,566,498 | 12/1925 | Miller | 106/724 |
| 2,141,571 | 12/1938 | Kennedy et al. | 106/748 |
| 2,203,809 | 6/1940 | Bechtold | 106/748 |
| 2,225,147 | 12/1940 | Bechtold | 106/748 |
| 2,463,561 | 3/1949 | Riley | 106/644 |
| 2,738,285 | 3/1956 | Biefeld et al. | 106/711 |
| 3,062,670 | 11/1962 | Marzocchi et al. | 106/711 |
| 3,147,127 | 9/1964 | Shannon | 106/716 |
| 3,183,106 | 5/1965 | Frankert | 106/748 |
| 3,331,695 | 7/1967 | Angstadt et al. | 106/748 |
| 3,373,048 | 3/1968 | Angstadt et al. | 106/748 |
| 3,442,673 | 5/1969 | Serafin | 106/724 |
| 3,492,138 | 1/1970 | Serafin | 106/724 |
| 3,586,741 | 6/1971 | Vognsgaard | 106/748 |
| 3,591,395 | 7/1971 | Zonsveld et al. | 106/724 |
| 3,615,783 | 10/1971 | Howard | 106/711 |
| 3,645,961 | 2/1972 | Goldfein | 106/724 |
| 3,650,785 | 3/1972 | Ball et al. | 106/644 |
| 3,716,386 | 2/1973 | Kempster | 106/724 |
| 3,783,092 | 1/1974 | Majumdar | 106/716 |
| 3,834,916 | 9/1974 | Kesler | 106/644 |
| 3,847,633 | 11/1974 | Race | 106/DIG. 2 |
| 3,852,082 | 12/1974 | Majundar | 106/716 |
| 3,899,344 | 8/1975 | Jakel | 106/724 |
| 3,902,912 | 9/1975 | Wolf | 106/711 |
| 3,903,879 | 9/1975 | Riley et al. | 428/359 |
| 3,969,567 | 7/1976 | Occleshaw et al. | 106/718 |
| 3,986,885 | 10/1976 | Lankard | 106/644 |
| 4,013,478 | 3/1977 | Meyer | 106/716 |
| 4,023,706 | 5/1977 | Dearlove et al. | 106/724 |
| 4,047,962 | 9/1977 | Copeland | 106/724 |
| 4,058,406 | 11/1977 | Raponi | 106/724 |
| 4,066,471 | 1/1978 | Burke | 106/716 |
| 4,070,199 | 1/1978 | Downing et al. | 106/696 |
| 4,093,471 | 6/1978 | Greig | 106/711 |
| 4,101,335 | 7/1978 | Barrable | 106/644 |
| 4,111,710 | 9/1978 | Pairaudeau et al. | 106/724 |
| 4,121,943 | 10/1978 | Akazawa et al. | 106/644 |
| 4,127,417 | 11/1978 | Okada et al. | 106/711 |
| 4,132,556 | 1/1979 | Camprincoli et al. | 428/724 |
| 4,133,928 | 1/1979 | Riley et al. | 428/255 |

(List continued on next page.)

FOREIGN PATENT DOCUMENTS 2235532  7/1972  Fed. Rep. of Germany .

(List continued on next page.)

OTHER PUBLICATIONS

*Ceramic Bulletin,* (1975), 54, pp. 271–276, "Fiber Reinforced Cement-Based Composites", Lankard.

(List continued on next page.)

*Primary Examiner*—Mark L. Bell
*Assistant Examiner*—Michael Marcheschi
*Attorney, Agent, or Firm*—Oblon, Spivak, McClelland, Maier & Neustadt

[57] ABSTRACT

A fiber-hydratable cement composition comprising a uniform dispersion of from 0.0001 to 10 volume percent interground fiber in hydratable cement powder is prepared by introducing fiber precursors and cement clinker to a grinding mill and grinding the mixture until the clinker has been reduced to a fine powder. The fiber can be steel, alkaline resistant glass, ceramic, carbon or organic polymer, and preferably are steel, polyolefin or mixtures thereof.

19 Claims, No Drawings

U.S. PATENT DOCUMENTS

| | | | |
|---|---|---|---|
| 4,190,456 | 2/1980 | Absolon et al. | 106/711 |
| 4,199,366 | 4/1980 | Schaeffer et al. | 106/724 |
| 4,240,840 | 12/1980 | Downing et al. | |
| 4,252,767 | 2/1981 | Piazza et al. | 264/256 |
| 4,261,754 | 4/1981 | Krenchel et al. | 106/724 |
| 4,263,365 | 4/1981 | Burgess et al. | 428/310 |
| 4,297,409 | 10/1981 | Hannaht | 428/247 |
| 4,297,414 | 10/1981 | Matsumoto | 428/400 |
| 4,306,911 | 12/1981 | Gordon et al. | 106/711 |
| 4,310,478 | 1/1982 | Balslev et al. | 264/22 |
| 4,314,853 | 2/1982 | Moens | 106/644 |
| 4,339,273 | 7/1982 | Meier et al. | 106/724 |
| 4,340,510 | 7/1982 | Howanietz et al. | 260/8 |
| 4,363,666 | 12/1982 | Johnson et al. | 106/711 |
| 4,369,054 | 1/1983 | Shinholster, Jr. et al. | 71/25 |
| 4,377,415 | 3/1983 | Johnson et al. | 106/724 |
| 4,379,870 | 4/1983 | Matsumoto | 523/221 |
| 4,407,676 | 10/1983 | Restrepo | 106/657 |
| 4,414,030 | 11/1983 | Restrepo | 106/724 |
| 4,414,262 | 11/1983 | Hartmann et al. | 428/222 |
| 4,419,136 | 12/1983 | Rice | 106/722 |
| 4,419,454 | 12/1983 | Long et al. | 501/95 |
| 4,428,775 | 1/1984 | Johnson et al. | 106/724 |
| 4,441,944 | 4/1984 | Massey | 156/71 |
| 4,483,727 | 11/1984 | Eickman et al. | 156/181 |
| 4,486,501 | 12/1984 | Holbek | 428/375 |
| 4,524,101 | 6/1985 | Eickman et al. | 428/294 |
| 4,528,238 | 7/1985 | Alford | 428/246 |
| 4,534,796 | 8/1985 | Massol | 106/716 |
| 4,594,210 | 6/1986 | Vittone et al. | 264/70 |
| 4,608,089 | 8/1986 | Gale et al. | 106/724 |
| 4,612,229 | 9/1986 | Vittone et al. | 428/155 |
| 4,617,219 | 10/1986 | Schupack | 428/113 |
| 4,723,509 | 2/1988 | Schaefer | 119/1 |
| 4,780,141 | 10/1988 | Double et al. | |
| 4,781,994 | 11/1988 | Enoki et al. | 428/703 |
| 4,808,229 | 2/1989 | Arhelger | 106/711 |
| 4,961,790 | 10/1990 | Smith et al. | 106/823 |
| 5,030,289 | 7/1991 | Sattler et al. | 106/805 |
| 5,062,897 | 11/1991 | Katsumata et al. | 106/819 |
| 5,100,474 | 3/1992 | Hawkins | 106/711 |
| 5,114,487 | 5/1992 | Gartshore et al. | 106/695 |
| 5,120,367 | 6/1992 | Smith et al. | 106/823 |
| 5,167,710 | 12/1992 | Leroux et al. | 106/711 |

FOREIGN PATENT DOCUMENTS

| | | |
|---|---|---|
| 54-20034 | 2/1979 | Japan . |
| 58-36981 | 3/1983 | Japan . |
| 7714571 | 7/1979 | Netherlands . |
| 1429167 | 3/1976 | United Kingdom . |
| 2003422 | 3/1979 | United Kingdom . |
| 2038701 | 7/1980 | United Kingdom . |
| 1582945 | 1/1981 | United Kingdom . |

OTHER PUBLICATIONS

"Comparison of Shrinkage Cracking Performance of Different Types of Fibers and Wiremesh": M. Sarigaphuti; Mar. 1991; ACI Spring Convention Presentation, Boston; pp. 1-17 and pages of drawings, FIGS. 1-15.

Concrete Technology Today: vol. 10, No. 3, Nov. 1989; Portland Cement Association; pp. 1-5.

Crack Width Study of Conventionally Reinforced Polypropylene Fiber Concrete Beams: Rice & Vondran; Nov. 1988; Paper No. 880282, pp. 1-26.

"Bonding in Cementitious Composites": S. Mindess; Dec. 1987; Materials Research Society Symposium Proceedings, vol. 114, pp. 145-152.

"Bonding in Polypropylene Fibre Reinforced Concretes": A. Bentur; Aug. 1989 vol. 11, No. 3; pp. 153-158.

The International Journal of Cement Composites & Lightweight Concrete "Concrete Durability": John M. Scanlon; 1985; American Concrete Institute, Detroit; pp. 377-396.

Design Considerations for Steel Fiber Reinforced Concrete: ACI Committee 544; Committee Report ACI 544.4R.

ACI Structural Journal, Title No. 85-S52; Oct. 1988; pp. 563-580.

Fibre Reinforced Cements & Concretes: Recent Developments; R. N. Swamy; Elsevier Applied Science; 1989; pp. 1-11.

Fibre Reinforced Cements-Scientific Foundations for Specifications: J. Aveston; National Physical Laboratory; Published in the UK in 1972; pp. 93-103.

(List continued on next page.)

OTHER PUBLICATIONS

Fiber Reinforcement for Concrete: Antoine E. Naaman; Mar. 1985; Concrete International; pp. 21–25.

Impact Resistance of Concrete Containing Both Conventional Steel Reinforcement & Fibrillated Polypropylene Fibers: Sidney Mindess; Dec. 1989, ACI Materials Journal, Technical Paper; Title No. 86-M51; pp. 545–549.

Permeability of Concrete: David Whiting; 1987; American Concrete Institute, Detroit, ACI SP-108; pp. 85–97.

Miscellaneous Commercial Publications, Received from Gary L. Vondran on Mar. 8, 1985, (Copied as received); 30 pages; dated 1985 or earlier.

Shrinkage Cracking of Fiber Reinforced Concrete: Miroslaw Grzybowski;—Apr. 1990; ACI Materials Journal, vol. 87, No. 2, Technical Paper, Title No. 87-M16; pp. 138–148.

Structural Materials: James F. Orofino; 1989; American Society of Civil Engineers; pp. 1–10.

*Fibermesch Micro-Reinforcement System;* (Publication) Fibermesh Company, 1989 FM-115 100M Aug. 1989; 11 pages.

Properties & Reinforcing Mechanisms in Steel Wool Reinforced Cement: A. Bentur; 1988; Israel Institute of Technology; pp. 101–110.

Properties of Concrete Reinforced with Fibrillated Polypropylene Fibers Under Impact Loading: Sidney Mindess; 1988 Pergamon Journals LTD Cement and Concrete Research; vol. 18, pp. 109–115.

Recent Advances in Concrete Technology: Parviz Soroushian; Feb. 1989; MSU CTS-3; Michigan State University, pp. 8.1–8.23.

INTERGROUND FIBER CEMENT

RELATIONSHIP TO COPENDING APPLICATION

This application is a continuation of application Ser. No. 07/934,589, filed Aug. 24, 1992, now abandoned which is a continuation of application Ser. No. 07/801,972, filed Dec. 2, 1992, now abandoned which is a continuation of application Ser. No. 07/580,831, filed Sep. 11, 1990, now abandoned which is a continuation-in-part of application Ser. No. 07/498,223, filed Mar. 23, 1990 now abandoned.

FIELD OF THE INVENTION

This invention relates to fiber reinforced cementitious compositions such as concrete, mortar and grout. In particular, this invention relates to the preparation of an interground fiber and cement composition which yields superior fiber reinforced concretes, mortars and grouts.

BACKGROUND OF THE INVENTION

The physical properties of concretes, mortars and grouts have been improved by including organic fibers in the mixtures. A wide variety of organic polymer fibers have been introduced into concrete mixtures in the form of monofilaments, fibrillated sheet materials and fibrils. The optimal polymers are chemically inert and devoid of groups which undergo hydrolysis in the initial wet mixtures and final 'set' compositions. Polyolefin and steel fibers, in particular, have proven to have superior tensile strain capacity and stability and to improve the concretes and mortars to which they have been added.

The fibers become micromechanically bonded to the cementitious products during the hydration and polymerization reactions, in part from shrinkage of the cementitious components during the setting reactions. They can provide impact, shatter and abrasion resistance, plastic shrinkage crack control, improved post-cracking characteristics, and prolonged fatigue life. However, in order to provide these and other improved characteristics, it is essential that the fibers be uniformly dispersed in the initial mixtures.

Prior to this invention, fibers used in cementitious compositions were sold as bulk, packaged fibrillated or monofilament fibers, or fibrils. The fibers were typically added to the mixer with the cement, sand, aggregate, other admixtures, and water. The longer fibers tend to clump and ball, particular at higher concentrations, and the shearing action of the mixer and composition components was relied upon to separate and disperse the fibers. Because of the opacity and texture of the cementitious mixtures, no visual monitoring of the mixing is possible. Examination of set cementitious compositions, however, reveals that optimal unbundling and efficient uniform dispersion of the fibers is not usually achieved.

SUMMARY AND OBJECTS OF THE INVENTION

A hydratable mixture comprising a uniform dispersion of from 0.0001 to 10 volume percent interground fiber in hydratable cement powder is prepared by introducing fiber precursors and cement clinker to a grinding mill and grinding the mixture until the clinker has been reduced to a fine powder. The fibers can be steel, alkaline resistant glass, carbon, ceramic or organic polymer fibers, or mixtures thereof. The preferred fiber precursors are steel fibers and polyolefin in the form of extruded monofilament or fibrillated sheet fiber having a diameter up to 20,000 denier and a length of from 1 to 75 mm. The optimal fibers are steel, polypropylene, and mixtures thereof.

It is the object of this invention to provide hydratable cementitious mixtures yielding fiber reinforced hydrated products with improved fiber surface bonding, tensile strain capacity, post crack behavior, toughness, impact strength, fatigue resistance, fire resistance, bonding to steel, corrosion resistance and ductility. These objects are achieved by the formation of a fiber-cement composition made by inter-grinding fiber precursors with cement clinker.

I have found that uniform dispersion is enhanced when the fibers are interground with the clinkers at the mill. During intergrinding and dispersing of the fibers, cement particles become embedded in the surfaces of the fibers, increasing the hydrophilicity of the surfaces. When contacted with water, the fibers are quickly wetted and remain dispersed during the mixing. This eliminates balls and clumps of fibers in the set cementitious compositions. As a result, the mechanical toughness and crack resistance achieved with a specific volume ratio of fibers to cement is increased, and the maximum concrete toughness which can be obtained with a particular fiber or fiber mixture is increased.

DETAILED DESCRIPTION OF THE INVENTION

Portland cement is formed by calcining a mixture of ground limestone, iron ore, sand and clay to a high temperature to form a clinker. The clinker is cooled and crushed to uniform particles having a size acceptable for a grinding mill such as a ball mill. The clinker particles are then ground to a fine powder, the powder form sold in normal commerce and familiar to the consumer. The powder is mixed with other ingredients and water to form a desired product such as a mortar, grout, shotcrete or concrete. Concretes are formed by hydrating mixtures of portland cement, sand, aggregate, admixtures and water, for example. Fiber additives are typically added at the same time as other additives are introduced to the mixture, and are dispersed as the components are intermingled in a mixer. Fiber additives are known to reduce the crack growth and width due to shrinkage of concrete during the setting reactions. However, because of the difficulty in dispersing the fibers during normal mixing, fiber aspect ratios greater than 100 to 1 are avoided. Furthermore, even with fibers having aspect ratios less than 100 to 1, the fibers cannot be relied upon to support major tensile loads because of observed and unavoidable variability in fiber distribution in the concrete. Hence, structural steel and reinforcing bars are relied upon to support the tensile loads.

In the method of this invention, an improved, uniformly dispersed fiber reinforced product is obtained by introducing fiber precursors with the clinker particles to the cement grinder. The fiber precursors are attenuated, roughened and abraded by the action of the clinker particles and the grinding elements on the fiber. Quick fiber wetting and uniform dispersion is obtained, without the balling and clumping found when adding the components at the time of concrete preparation. The attenuated, roughened and finely abraded fibers form much stronger mechanical bonds with the cement during the hydration, yielding an increase in all of the properties for which fiber reinforcements are valued. Fiber aspect ratios (length divided by diameter) of greater than 100 to 1 can be used, and the uniformity of fiber distribution is increased to the level that the fibers can be relied upon to support a larger portion of the tensile load.

With prior art dispersing methods, fiber concentrations above a relatively low absolute volume ratio or concentration impair the physical properties of the concrete. With the method of this invention, much higher absolute volumes or concentrations of fibers can be incorporated with increases in strength, crack resistance and other desired properties. Even at the lower absolute volume ratios, the effective increase in desired properties and "fiber reinforcing efficiency" of the fibers are increased.

The invention is described hereinafter in terms of portland cement containing compositions for purposes of clarity of explanation and not by way of limitation, and the method and composition are equally suitable for any cementitious composition which is made by grinding the hydratable composition to form a fine powder and where the grinding interaction of grinding elements and mineral particles with the fibers can produce the improved interground fibers.

The fibers which can be used in this invention include any inorganic or organic polymer fiber which has the requisite alkaline resistance, strength and stability. The term "alkaline resistant", as used herein, is defined to mean alkaline resistance in most portland cement environments.

Suitable inorganic fibers include steel, alkaline resistant glass, carbon (graphite), and ceramic fibers. Steel fibers are the preferred inorganic fibers. They can be in the form of heavy strips or wires, or fine fibers such as "steel wool".

Suitable organic fibers are rayon, nylon and other polyamides, polyacrylonitriles, polyvinyl acetate, polyvinyl alcohol, polyvinyl chloride, polyvinylidene chloride, polyesters such as dacron and mylar, orlon, and polyolefins such as polyethylene and polypropylene. Polyolefins are preferred because of their chemical inertness and stability, deformable surface characteristics, and their behavior during attenuation. During attenuation in the grinding action, molecules become aligned, and the tensile strain capacity of the fibers are improved. The fiber surface becomes roughened and fibrilamentized, increasing mechanical bonding characteristics with the cement in the set cementitious composites. The optimal polyolefin fibers are polypropylene monofilaments and fibrillated polypropylene films.

Intergrounding mixtures of fibers are also included within the scope of this invention. Optimal mixtures comprise polyolefin and steel fibers, the specific properties of each in the concrete mixtures providing a complementary improvement in crack resistance and toughness.

The interground inorganic fiber precursors can be any metal, alkaline resistant glass, synthetic ceramic or carbon fibers. These materials are commercially available and widely used to reinforce cementitious and polymeric structures. A suitable source of steel fibers is Novocon International, Inc. (Chicago, Ill.).

The interground organic fiber precursors can be conventional polyolefin monofilaments and fibrillated plastic films such as described for used in concrete admixtures in U.S. Pat. Nos. 3,591,395, 4,297,409 and 4,414,030, for example. They can have a diameter or equivalent diameter of from minus deniers up to 20,000 and preferably from 1 to 4000 denier.

The term "equivalent diameter", as used herein, is defined to be the diameter of a circle having a cross-sectional area equal to the cross-sectional area of the fiber. The term is particularly applicable to describe the relative size of precursor fibers made by stretching and cutting films.

The precursor fibers can have a length of from 1 to 75 mm and preferably have a length of from 5 to 50 mm. The fibrous component is added to the clinker in an amount producing an interground fiberground cement composition having from 0.0001 to 10 volume percent fiber and preferably from 0.1 to 5.0 volume percent fiber.

The particular size and amount of fiber introduced depends upon the end product for which the portland cement is being prepared. For grout and mortar, for example, the precursor fiber diameter or equivalent is preferably from 1 to 1000 denier, the precursor fiber length is preferably from 5 to 15 mm, and the fiber concentration is preferably from 0.1 to 5 volume percent. For concrete slabs on grade, the precursor fiber diameter is preferably from 1 to 2000 denier and precursor fiber length is preferably from 5 to 25 mm, and the fiber concentration is preferably from 0.1 to 2 volume percent. For bridges and other structures where the concrete is combined with steel in the form of beams with rods to form weight bearing structures subjected to high stresses, the precursor fiber diameter is preferably from 6 to 5000 denier and precursor fiber length is preferably from 10 to 50 mm, and the fiber concentration is preferably from 0.1 to 5 volume percent. The fiber-hydratable cementitious powder mixture is packaged, stored, and admixed with other components to form grouts, mortars, shotcretes and concretes in the same manner and in the same proportions which are conventionally used to prepare conventional fiber reinforced cementitious products. The interground fiber reinforced cementitious products have improved fiber surface bonding, tensile strain capacity, post crack behavior, toughness, impact strength, fatigue resistance, fire resistance, bonding to steel, corrosion resistance and ductility. These objects are achieved by the formation of fiber-cement admixtures by inter-grinding fiber precursors with cement clinker.

I claim:

1. A method for preparing an interground reinforcing fiber-hydratable cement composition comprising introducing at least one fiber precursor and cement clinkers to a grinding mill and grinding the mixture until the clinker has been reduced to a fine powder, the amount of the fiber precursor added being sufficient to yield from 0.0001 to 10 volume percent interground fiber in the ground product, wherein the fiber is selected from the group consisting of steel, alkaline resistant glass, ceramic, carbon, polyolefin, polyamide and mixtures thereof.

2. A method of claim 1 wherein the fiber comprises steel.

3. A method of claim 1 wherein the fiber comprises polyolefin.

4. A method of claim 1 wherein the fiber comprises a mixture of steel and polyolefin.

5. A method of claim 1 wherein the fiber precursor is a polyolefin in the form of extruded monofilament or fibrillated stretched or unstretched sheet fiber having a diameter up to 20,000 denier and a length of from 1 to 75 mm.

6. A method of claim 5 wherein the fiber precursor is polypropylene.

7. A fiber-hydratable cementitious composition produced by the process comprising introducing fiber precursors and cement clinkers to a grinding mill and grinding the mixture until the clinker has been reduced to a fine powder, the amount of fiber precursor added being sufficient to yield from 0.0001 to 10 volume percent interground fiber in the ground product.

8. A fiber-hydratable cement composition comprising a uniform dispersion of from 0.0001 to 10 volume percent of at least one interground fiber in hydratable cement powder, wherein the fiber is formed by grinding a fiber precursor with clinker to form a fiber-hydratable cement mixture, the fiber precursor being selected from the group consisting of steel, alkaline resistant glass, ceramic, carbon, polyolefin, polyamide and mixtures thereof.

9. A fiber-hydratable cement composition of claim 8 wherein the fiber is steel.

10. A fiber-hydratable cement composition of claim 8 wherein the fiber is polyolefin.

11. A fiber-hydratable cement composition of claim 8 wherein the fiber is a mixture of steel and polypropylene.

12. A fiber-hydratable cement composition of claim 8 wherein the fiber is a polyolefin in the form of extruded monofilament or fibrillated stretched or unstretched sheet fiber having a diameter up to 20,000 denier and a length of from 1 to 75 mm.

13. A fiber-hydratable mixture of claim 12 wherein the fiber is polypropylene.

14. A method of claim 1, wherein said interground fiber comprises an organic polymer fiber and wherein cement clinker particles become embedded in the surfaces of said interground fiber during said intergrinding.

15. A method of claim 14, wherein said organic polymer fiber is selected from the group consisting of rayon, polyamides, polyacrylonitriles, polyvinyl acetate, polyvinyl alcohol, polyvinyl chloride, polyvinylidene chloride, polyesters and polyolefins.

16. A method of claim 1, wherein said interground fiber is nylon.

17. A fiber-hydratable cement composition of claim 8, wherein said interground fiber is an organic polymer fiber.

18. A fiber-hydratable cement composition of claim 17, wherein said organic polymer fiber is selected from the group consisting of rayon, polyamides, polyacrylonitriles, polyvinyl acetate, polyvinyl alcohol, polyvinyl chloride, polyvinylidene chloride, polyesters and polyolefins.

19. A fiber-hydratable cement composition of claim 8, wherein said interground fiber is nylon.

* * * * *